Oct. 18, 1966 D. E. MINGS 3,279,466
EYE DROP AID FOR ADMINISTERING OPHTHALMIC SOLUTION
WITHOUT EXCESSIVE HEAD TILTING
Filed June 19, 1963
FIG.1
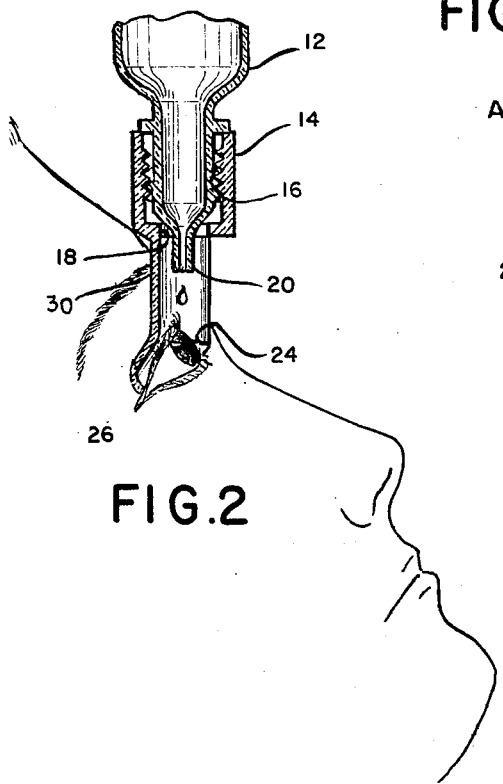
FIG.2
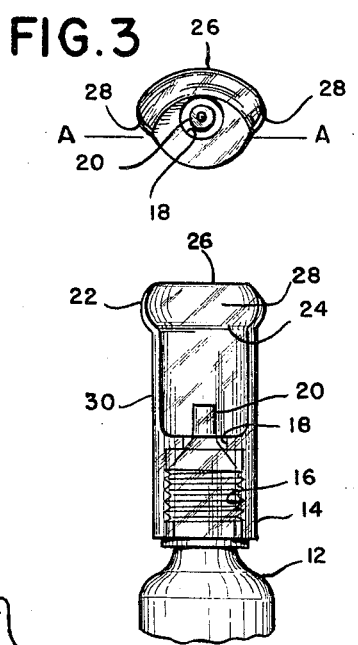
FIG.3
FIG.4
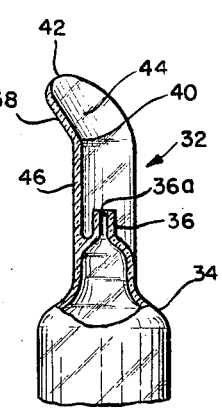
FIG.5
INVENTOR.
Dwain E. Mings
BY
Bayard H. Michael
Attorney 
United States Patent Office 3,279,466
Patented Oct. 18, 1966

3,279,466
EYE DROP AID FOR ADMINISTERING OPHTHALMIC SOLUTION WITHOUT EXCESSIVE HEAD TILTING
Dwain E. Mings, Rte. 3, Monroe, Wis.
Filed June 19, 1963, Ser. No. 289,084
10 Claims. (Cl. 128—233)

This invention relates to improved apparatus for the administration of eye drops.

Generally, it is necessary to assume a horizontal position or to tilt the head sufficiently to administer eye drops or to permit placement of the drops in the eye, generally an uncomfortable position. Due to the natural reflex of the eye to close as a particle approaches it, assuming a horizontal position or tilting the head back is no assurance that the drops will be placed in the eye. Hence, applying eye drops with heretofore available devices has generally been extremely difficult, uncomfortable and resulted in little, if any, of each drop getting into the eye so that several attempts were necessary to insure placement of the ophthalmic solution in the eye. Thus considerable amounts of the solution were wasted with no real assurance that a prescribed amount of solution was placed in the eye.

An object of this invention is to provide for effective administration of eye drops; and, furthermore, to do so without the necessity for assuming either a horizontal position or requiring excessive tilting of the head.

For the achievement of the above stated and other objects of this invention, it is proposed to provide improved apparatus which can either be constructed integrally with an eye drop solution container or may comprise a separate, releasable attachment which can be used with the container. The apparatus includes an aperture through which eye drops can be administered and can take the form of the usual dispensing nipple through which the ophthalmic solution is discharged in the form of drops or can be a suitably constructed opening for receipt of that nipple where the apparatus takes the form of a releasable attachment for use with the container. An eye lid engaging member, preferably so constructed as to fit comfortably onto the eye, is associated with the aperture such that it is engageable with an operative to open the eye lid and to hold the eye lid open as the drops are dispensed. The relationship between the eye lid engaging member and the aperture through which the drops are dispensed is such that when the eye lid is held open by the eye lid engaging member the aperture is positioned over the eye so that drops can be placed therein without requiring excessive tilting of the head. Accordingly, the apparatus constructed in accordance with this invention opens the eye and holds the eye open during application of the ophthalmic solution to the eyes to thereby counteract the natural reflex of the eye lid to close while positioning the drop dispensing aperture over the eye without excessive tilting of the head.

Other objects and advantages will be pointed out in, or be apparent from, the specification and claims, as will obvious modifications of the embodiments shown in the drawings, in which:

FIGS. 1 and 2 illustrate a preferred embodiment of this invention as it is in the administration of eye drops;

FIG. 3 is a top plan view of an embodiment of this invention;

FIG. 4 is a front elevation thereof; and

FIG. 5 is a partial longitudinal section through an alternative embodiment of this invention.

With particular reference to the drawings, an eye drop aid is illustrated in FIGS. 1–4 as comprising a separable unit 10 which can be releasably connected to a suitable ophthalmic solution container 12 or, as will be described more completely hereinafter in connection with FIG. 5, the eye drop aid can be formed integrally with the ophthalmic solution container. Structurally, eye drop aid 10 includes a base 14 having internal threads 16 and an aperture 18 so that the eye drop aid can be screwed onto a standard container 12 with the eye drop dispensing nipple 20 extending through aperture 18.

An eye lid engaging surface 22 includes an inner arcuate edge 24, an outer arcuate edge 26, and a generally concave-convex surface 28 extending between the inner and outer arcuate edges to form a generally cup-shaped surface which will fit comfortably onto the eye. A curved web 30 extends from the base 14 to the inner arcuate edge 24 to support the cup-shaped surface spaced outwardly of aperture 18, or the drop dispensing nipple 20. With this arrangement, the cup-shaped surface 22 can be placed onto the upper eye lid with the inner arcuate edge 24 positioned generally along the eye lash line, see FIGS. 1 and 2. The remainder of the cup-shaped surface 22, namely outer edge 26 and concave-convex surface 28, fit comfortably onto the eye and, with the eye drop aid so positioned, the upper eye lid can be pushed back to open the eye for receipt of the ophthalmic solution. During the application of the eye drops, surface 22 holds the eye open and prevent closure thereof due to reflex action.

To eliminate the necessity for either assuming a horizontal position or unduly tilting the head backward for application of the eye drops, the eye drop aid is so constructed that the aperture through which the eye drops are dispensed is positioned closely adjacent the inner eye lid engaging surface 24 but in spaced relation therefrom to insure administering the ophthalmic solution in a sterile condition. More particularly, and with reference to FIG. 3, it will be noted that the aperture through which the eye drops are dispensed and the eye lid engaging surface 24 are eccentrically related on base 14, in other words the inner arcuate edge 24 is positioned closer to the dispensing aperture than the distance between the aperture and the edge of the base. With this arrangement and when the upper eye lid is held open as illustrated in FIG. 2, the drop dispensing opening will be positioned over the eye without the necessity for extreme tilting of the head. As can be seen in FIG. 2, the head need only be tilted approximately 35–45° to the vertical to properly position the dispenser to place drops directly in the eye. In the illustrated preferred embodiment, the aperture 18 through which nipple 20 extends is positioned in an area defined by the arcuate inner edge 24, and web 30, and a cord A—A connecting the opposite ends of the inner arcuate edge. With this relationship, eye drops can be placed in the eye and there is no need for repeated drops to insure the proper amount of solution entering the eye and without any waste of ophthalmic solution. It has been observed that with a minimum familiarity with the use of the eye drop aid, drops can be placed in the eye with one application, or as many drops as is prescribed, with no need for repeated application which provides for accurate application of ophthalmic solution in any prescribed amount.

It is appreciated that this invention can take forms other than that illustrated in FIGS. 1–4 and, as an illustration of one such alternative, a construction has been illustrated in FIG. 5 wherein the eye drop aid 32 is formed integrally with an ophthalmic solution container 34. In this instance the container 34 becomes the equivalent of base 14 from which eye drop aid 32 extends and the nipple 36 alone provides the aperture through which the eye drops are dispensed. In this embodiment the eye lid engaging surface 38 is constructed identically to that of eye lid engaging surface 22. More particularly, it includes an inner eye lid engaging edge 40, an outer eye lid engaging edge 42 and a connecting concave-convex surface 44 so that the eye lid engaging member 38 is generally cup-shaped and will fit comfortably onto the eye. A web 46 extends outwardly of the base provided by container 34 and supports the cup-shaped eye lid engaging surface 38 in spaced relationship from the drop dispensing nipple 36. The dispensing aperture 36a of the nipple is positioned closely adjacent, but spaced from, the inner arcuate surface 40 of the eye lid engaging surface, i.e. in a transverse direction through the dropper aid, so that drops can be placed in the eye without extreme tilting of the head. Again in this embodiment the inner surface 40 is generally arcuate in a plane transverse to the eye drop aid and the aperture 36a is positioned relative to that inner surface as to be disposed within an area defined by a cord connecting the opposed ends of the arcuate surface and the arcuate surface itself.

It is appreciated that this invention can take various forms and that obvious modifications thereof will occur to those skilled in the art with the benefit of the above description. For example, the cup-shaped eye lid engaging member could be eliminated and only arcuate surface 24, or 40, provided on the eye drop aid; however, it is recognized that the use of the cup-shaped member is preferred since it provides a comfortable and effective medium for locating the eye drop aid on the eye and for opening the eye and holding it open. Furthermore, the positioning of the eye lid engaging member and the opening through which the eye drops are dispensed can be varied on the base provided the eccentric relationship therebetween is maintained so that the eye drop dispensing aperture is positioned closely adjacent but spaced from the eye lid engaging member. Namely, the relationship described wherein the eye drop dispensing aperture is closer to the central portion of the eye lid engaging surface than to its ends or, more specifically, where the eye lid engaging member is arcuate the distance between the dispensing aperture and the eye lid engaging member being less than the radius of curvature of the member. Also, the releasable connection of the eye drop aid with the container could be achieved by forming the drop aid so that it will snap onto the container at its body portion or its neck, e.g. forming the drop aid to a general U-shape and using the resiliency of the aid to clamp onto the container.

Although this invention has been illustrated and described in connection with particular embodiments thereof, it will be apparent to those skilled in the art that various changes and modifications may be made therein without departing from the spirit of the invention or from the scope of the appended claims.

What I claim is:
1. An eye drop dispensing aid comprising, in combination,
  an elongated base having means for connection to an eye drop container,
  eye lid engaging means,
  support means connecting said eye lid engaging means to said base, said support means extending from said base in a direction generally parallel to the longitudinal axis of said base and supporting said eye lid engaging means spaced outwardly from said base,
  said eye lid engaging means including a first arcuate surface in a plane transverse to said longitudinal axis and having opposite free ends which are spaced apart in said plane, said eye lid engaging means also including a surface arcuate in a direction generally normal to said plane and projecting from generally between the free ends of said first arcuate surface and outwardly from said first arcuate surface with respect to said base, said eye lid engaging means engageable on the upper eye lid to open and hold open the upper eye lid,
  and means defining an opening in said base through which drops are dispensed and arranged, in a direction parallel to said plane, generally centrally of said eye lid engaging means and spaced from the central portion of said first arcuate surface a distance less than the radius of curvature of said first arcuate surface so that said aperture is disposed closely adjacent said first arcuate surface in the direction of said plane and said aperture will be positioned vertically above and dispense drops into an eye with the head tilted at a relatively small angle to the vertical.

2. An eye drop dispenser comprising, in combination, a generally elongated container for eye drop fluid,
  means defining a dispensing aperture in one end of said container,
  eye lid engaging means,
  support means connected to said container and engaging said eye lid engaging means, said support means extending longitudinally outwardly beyond said one end of said container and supporting said eye lid engaging means spaced outwardly from said one end of said container and said dispensing aperture,
  said eye lid engaging means including a first arcuate surface in a plane transverse to said longitudinal axis and having opposite free ends which are spaced apart in said plane, said eye lid engaging means also including a surface arcuate in a direction generally normal to said plane and projecting from generally between the free ends of said first arcuate surface and outwardly from said first arcuate surface with respect to said base, said eye lid engaging means engageable on the upper eye lid to open and hold open the upper eye lid,
  and said aperture being arranged, with respect to said eye lid engaging means and in a direction generally parallel to said plane, generally centrally of said eye lid engaging means and spaced from the central portion of said first arcuate surface a distance less than the radius of curvature of said first arcuate surface so that said aperture is disposed closely adjacent said first arcuate surface in the direction of said plane and said aperture will be positioned vertically above and dispense drops into an eye with the head tilted at a relatively small angle to the vertical.

3. The eye drop dispenser of claim 2 wherein said eye lid engaging means and support means are a one-piece assembly and including means releasably connecting said one-piece assembly to said container.

4. The eye drop dispenser of claim 2 wherein said eye lid engaging means, support means and said container are a one-piece assembly.

5. The eye drop dispenser of claim 2 including
  a second arcuate surface spaced, with respect to said base, outwardly from said first arcuate surface and being arcuate in and having opposite free ends relatively spaced apart in a direction generally parallel to said plane,
  and wherein said surface arcuate in a direction generally normal to said plane extends between said first and second arcuate surfaces to render said eye lid engaging means generally cup-shaped to conform to and fit comfortably on an eye.

6. In combination,
  an elongated base having means for connection to an eye drop container,
  eye lid engaging means,
  support means connecting said eye lid engaging means to said base, said support means extending from said base in a direction generally parallel to the longitudinal axis of said base and supporting said eye lid engaging means spaced outwardly from said base,
  said eye lid engaging means including an arcuate surface in a plane transverse to said longitudinal axis and having opposite free ends which are spaced apart in said plane, said arcuate surface being engageable with and operative to hold the upper eye lid open,
  and means defining an aperture in said base through which drops are dispensed and arranged, in a direction parallel to said plane, within an area defined by a cord between the free ends of said arcuate surface and said arcuate surface with the distance between said aperture and arcuate surface in the direction of said plane being less than the radius of curvature of said arcuate surface so that said aperture is disposed closely adjacent said eye lid engaging means in the direction of said plane and said aperture will be positioned vertically above and dispense drops into an eye with the head tilted at a relatively small angle to the vertical.

7. The combination of claim 6 including a container for eye drop fluid,
and wherein said base is connected to said container.

8. The combination of claim 7 wherein said eye lid engaging means includes a second surface spaced, with respect to said base, outwardly from said first mentioned arcuate surface, said second surface being arcuate in and having opposite free ends relatively spaced apart in a direction parallel to said plane,
and said eye lid engaging means further characterized by an arcuate configuration in a direction generally normal to said plane and between said arcuate surfaces which renders said eye lid engaging means generally cup-shaped to conform to and fit comfortably on an eye.

9. The combination of claim 8 including means releasably connecting said eye lid engaging means and said support means to said container.

10. The combination of claim 8 wherein said eye lid engaging means, support means, base and container are one-piece.

References Cited by the Examiner

UNITED STATES PATENTS

| | | | |
|---|---|---|---|
| 914,295 | 3/1909 | Maher | 128—249 |
| 2,482,431 | 9/1949 | Okawa | 128—233 |
| 3,016,898 | 1/1962 | Erwin | 128—249 |

FOREIGN PATENTS

| | | |
|---|---|---|
| 722,852 | 1/1932 | France. |
| 1,259,476 | 3/1961 | France. |
| 269,621 | 1/1914 | Germany. |

RICHARD A. GAUDET, *Primary Examiner.*

D. S. BURKS, R. L. FRINKS, *Assistant Examiners.*